United States Patent
Woodruff

(10) Patent No.: US 6,195,933 B1
(45) Date of Patent: Mar. 6, 2001

(54) DELIVERY SYSTEM FOR FLUID MATERIAL

(75) Inventor: Keith F. Woodruff, Mountainside, NJ (US)

(73) Assignee: American Cyanamid Company, Madison, NJ (US)

( * ) Notice: Subject to any disclaimer, the term of this patent is extended or adjusted under 35 U.S.C. 154(b) by 0 days.

(21) Appl. No.: 09/243,281

(22) Filed: Feb. 2, 1999

(51) Int. Cl.⁷ ................................................. A01M 1/20
(52) U.S. Cl. ............................................. 43/131; 43/132.1
(58) Field of Search ......................... 43/131, 121, 132.1, 43/107

(56) References Cited

U.S. PATENT DOCUMENTS

| | | | |
|---|---|---|---|
| 1,056,535 | 3/1913 | Grimes | 43/131 |
| 1,103,032 * | 7/1914 | Childress | 43/131 |
| 1,118,508 | 11/1914 | Miller | 43/131 |
| 1,125,519 | 1/1915 | Harmon | 43/131 |
| 1,186,178 | 6/1916 | French | 43/131 |
| 1,328,936 | 1/1920 | Watson | 43/131 |
| 1,572,098 | 2/1926 | Wiggins | 43/131 |
| 1,573,278 | 2/1926 | Schlesinger | 43/131 |
| 2,045,018 | 6/1936 | Loibl | 43/131 |
| 2,088,335 | 7/1937 | Michaels | 43/131 |
| 2,113,548 | 4/1938 | Nederman | 43/131 |
| 2,176,345 | 10/1939 | Hurwitt | 43/131 |
| 2,234,500 * | 3/1941 | Moore | 43/121 |
| 2,254,948 | 9/1941 | Kubalek | 43/131 |
| 2,257,655 | 9/1941 | Scott | 43/131 |
| 2,456,324 | 12/1948 | Roossner | 43/131 |
| 3,146,546 | 9/1964 | Moore | 43/131 |
| 4,030,233 * | 6/1977 | Wunsche | 43/121 |
| 4,310,985 * | 1/1982 | Foster et al. | 43/131 |
| 4,563,836 | 1/1986 | Woodruff et al. | 43/131 |
| 4,761,912 | 8/1988 | Dyer et al. | 43/121 |
| 4,793,093 | 12/1988 | Gentile | 43/131 |
| 4,823,506 | 4/1989 | Demarest | 43/131 |
| 4,837,969 | 6/1989 | Demarest | 43/131 |
| 4,841,669 | 6/1989 | Demarest et al. | 43/131 |
| 4,894,947 | 1/1990 | Brandli | 43/131 |
| 5,033,229 | 7/1991 | Demarest et al. | 43/131 |
| 5,048,225 | 9/1991 | Brandli | 43/133 |
| 5,119,586 | 6/1992 | Townsend | 43/121 |
| 5,172,514 | 12/1992 | Weber | 43/132.1 |
| 5,238,681 | 8/1993 | Chang et al. | 43/131 |
| 5,357,709 | 10/1994 | Lin | 43/131 |
| 5,501,033 | 3/1996 | Wefler | 43/131 |
| 5,548,922 * | 8/1996 | Wefler | 43/131 |
| 5,875,586 * | 3/1999 | Ballard et al. | 43/131 |
| 5,943,816 * | 8/1999 | Hyatt et al. | 43/131 |
| 5,983,558 * | 11/1999 | Las et al. | 43/131 |
| 6,041,542 * | 3/2000 | Payton et al. | 43/131 |

FOREIGN PATENT DOCUMENTS

WO 94/27430   12/1994   (WO) .
WO 98/25454   6/1998    (WO) .

* cited by examiner

*Primary Examiner*—Darren W. Ark
(74) *Attorney, Agent, or Firm*—Charles F. Costello

(57) ABSTRACT

A system for delivery of fluid material, and more particularly, a bait station for delivery of fluid insecticide, is formed from a base having at least one feeding station, and a reservoir for storing fluid insecticides beneath the base. The insecticide is transferred by capillary action from the reservoir to the feeding station through at least one connecting tube. At least one hollow member extends upwardly from the base to support a cover removably mounted over the base, and to provide a conduit for refilling the reservoir with fluid. The cover and the base are designed to provide access to insects to the feed station when the cover is mounted over the base.

28 Claims, 2 Drawing Sheets

DELIVERY SYSTEM FOR FLUID MATERIAL

BACKGROUND OF THE INVENTION

The present invention is directed to a device for delivery of fluid from a reservoir to a predetermined station located above the reservoir. In the preferred embodiment of the invention, the device comprises a bait station for insects, and in particular carpenter ants, and the fluid is a liquid or semi-liquid insecticide.

Bait stations for dispensing insecticide for controlling insects are known to the art. Typical bait stations are disclosed in U.S. Pat. Nos. 4,563,836 issued to Woodruff et al; 4,761,912 issued to Dyre et al; 4,793,093 issued to Demarest et al; 4,837,969 issued to Demarest; 5,033,229 issued to Demarest et al; 5,357,709 issued to Lin; and 5,548,922 issued to Weffler. Of these patents, U.S. Pat. Nos. 5,033,229 and 5,548,922 disclose bait stations for delivery of a liquid bait material. The liquid delivery means disclosed in these two patents employs a pad for absorbing liquid insecticide from a reservoir, and for providing insects with access to portions of the pad saturated with the liquid insecticide.

It is a primary object of the present invention to provide a device for supplying or delivering fluid from a reservoir to a predetermined location, and in particular, an improved bait station for delivery of liquid or semi-liquid insecticide to at least one insect feeding station. In accordance with the present invention, a feeding station is carried on a base of a delivery device, the feeding station is coupled in fluid communication to a reservoir for insecticide beneath the base by by at least one connecting tube, and the insecticide is transported from the reservoir to the feeding station through the connecting tube by capillary action.

Other objects, advantages and improvements of the invention will become apparent from the following description.

SUMMARY OF THE INVENTION

A device for transporting fluid from a reservoir to a base includes one at least one outlet station carried or defined on the upper surface of the base and in communication with a fluid reservoir defined beneath the base. At least one conduit, preferably a tube, delivers fluid from the reservoir to the outlet station by means of capillary action. The inlet end of the tube received in the reservoir is preferably elliptical in cross-section and oriented along a plane which is not normal to the plane of the base, for enhancing the effect of the capillary action. A cover is removably mounted to at least one supporting post extending upwardly from the base, and the cover and the base are configured and arranged to define at least one opening therebetween to provide access to the outlet station when the cover is mounted over the base. The supporting post defines a channel thereon, and an outlet end of the supporting post is in fluid communication with the reservoir defined beneath the base so that the reservoir may be refilled through the channel in the supporting post. The removable cover includes at least one element received in the inlet end of the supporting post for sealing the inlet end when the cover is mounted over the base.

In its preferred embodiment, the delivery device in accordance with the present invention provides a bait station for insects, in which the reservoir holds a liquid or semi-liquid insecticide, and the station carried or defined on the upper surface of the base is a feeding station for insects. The insecticide is transported from the reservoir to the feeding station by capillary action, and the insects are provided with access to the feeding station on the base through the opening defined between the cover and the base. A plurality of feeding stations can be provided on the base, and each feeding station can receive the outlet end of one or more connecting tubes, the inlet ends of the tube being in fluid communication with the reservoir therebelow. In one embodiment of the invention, the reservoir defined beneath the base is common to all feeding stations, and the same material in the reservoir is transported to each feeding station.

In an alternative embodiment of the invention, the reservoir is partitioned into different separate sections so that each of a plurality of feeding stations is not supplied with fluid from the same reservoir. In this manner, one or more of the feeding stations can be supplied with insecticide different from the insecticide supplied to other feeding stations. It is also within the scope of the present invention for each individual feeding station to be supplied with fluid from a separate reservoir section communicating only with that individual feeding station. Separate means for refilling the different reservoir sections are provided in this alternative embodiment.

Although the device of the present invention, when employed as a bait station, is particularly useful in connection with the control of carpenter ants, it is also useful for controlling the population of other insects and animals.

DESCRIPTION OF THE BEST MODES FOR CARRYING OUT THE INVENTION

FIGS. 1–5 illustrate the preferred embodiments of a device for delivery of fluid from a reservoir to a predetermined location or station on the device in accordance with the present invention. The device is particularly useful as a bait station for insects, and in particular a bait station for supplying liquid or semi-liquid to control the population of insects, particularly carpenter ants. As is known in the art, liquid or semi-liquid insecticides for controlling insects such as carpenter ants include both an attractant for inducing an insect to enter a bait station, and a toxicant, preferably a delayed action toxicant, for eradicating the insect after the toxicant has been ingested.

Figure 1:
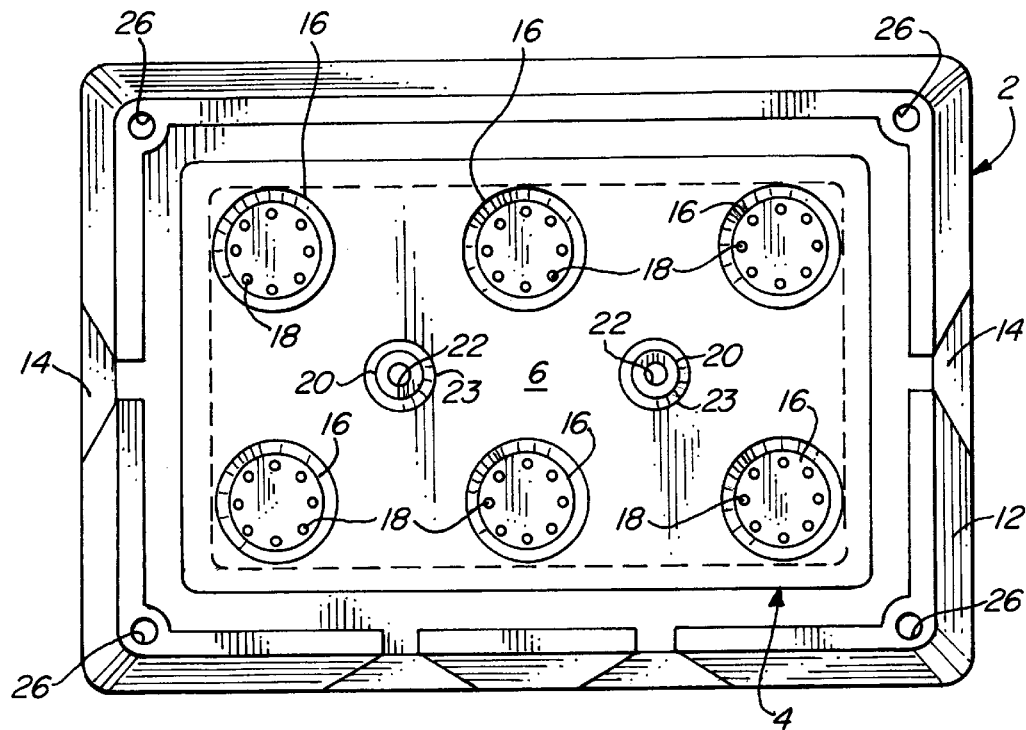
FIG. 1 is a top plan view of a device in accordance with the present invention with the cover removed.
Figure 2:
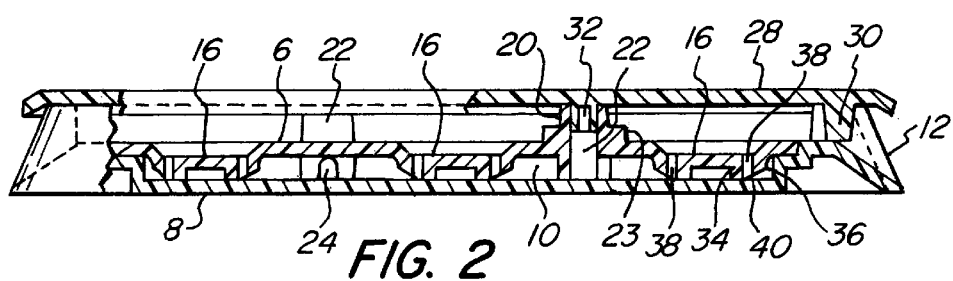
FIG. 2 is a side elevational view, in section, of the device illustrated by FIG. 1 with the cover mounted thereon.

The device in accordance with the present invention includes two major components—a main housing, and a cover removably mounted over the top surface of the housing. FIG. 1 of the drawing illustrates a top view of the housing with the cover removed, and FIG. 2 illustrates a section through the device with the cover mounted to the housing. Referring to FIGS. 1–2, the housing is generally designated by reference numeral 2 and includes a central base generally designated by the reference numeral 4 having a top surface 6 separated from a bottom surface 8 to define a chamber 10 therebetween. As best shown by FIG. 1, the base is generally rectangular in configuration.

The periphery of the base is defined by four sidewalls designated by reference numeral 12, and one or more ramp shaped cut-out sections 14 are defined in one or more of the sidewalls 12 to provide insects with access to the top surface 6 of the base. The ramp sections 14 are upwardly inclined from the bottom surface 8 to the top surface 6 in a direction oriented inwardly towards the center of the housing 2. A plurality of feeding stations generally designated by reference numeral 16 are provided on the top surface 6. Each feeding station is generally circular in configuration, and defines a plurality of equidistantly spaced, radially oriented openings each designated by reference numeral 18. As will be discussed in greater detail below, each of the openings 18 is the discharge end of a conduit, preferably a capillary tube, having an inlet end communicating with fluid in a reservoir defined by the chamber 10 beneath the top surface 6 of the base.

Two posts designated by reference numeral 20 extend from the top surface 6 of the base. The posts 20 are provided along the longitudinal center of the base, and are equidistantly spaced from the respective adjacent sidewalls 12. A ring shaped open well sponge, designated by reference numeral 23, is mounted around the outer surface of each post 20. The bottom of the sponge is supported by the top surface 6 of the base. The center portion of each post is hollow to define a circular channel or conduit designated by reference numeral 22 which extend through the upper surface 6 of the base. As most clearly illustrated by FIG. 2, the lower end of each channel 22 defines an opening 24 extending into the reservoir 10 to provide communication with fluid within the reservoir.

A cover 28 removably mounted over the base 2, is best shown in FIG. 2. Members 30, which can be pins or pegs, extend downwardly from the corners of the lower surface of the cover and are oriented to register with respective openings 26 in the corners of the base. Accordingly, the cover 28 is removably mounted to the base by aligning the cover over the base such that the pins 30 are received within the corresponding opening 26 in the corners of the base. FIG. 2 also illustrates a member 32 extending downwardly from the bottom surface of the cover 28 and oriented so that it is received within the upper portion of the channel 22 defined in one of the posts 20 when the cover is mounted to the base. A second member 32 is also provided to extend downwardly from the lower surface of the cover and be received in the top of the channel 22 of the other post 20 illustrated by FIG. 1 when the cover is mounted to the base. The members 32 provide plugs for sealing the tops of the channels 22 when the cover 28 is mounted over the base 2.

Figure 3:
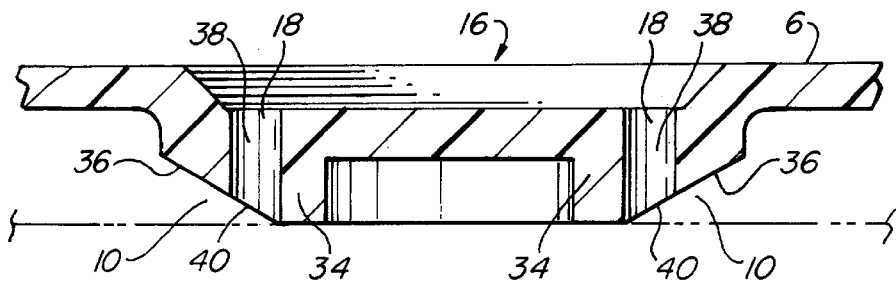
FIG. 3 illustrates, in detail, a portion of the device illustrated by FIG. 2.

As shown in FIG. 2, and as more clearly illustrated by FIG. 3, the openings 18 in each of the feed stations 16 are discharge outlets of conduits, which are preferably capillary tubes 38 extending through the upper surface 6 of the base. A section 34 of the top surface 6 of the base extends downwardly towards the bottom surface 8 of the base, and the section 34 defines a plurality of bevelled edges designated by reference numeral 36. The capillary tubes 38 (or other suitable conduit means) extend through the section 34, and each tube defines an inlet opening 40 on a bevelled edge 36. Each inlet opening 40 is oriented at an angle relative to the plane of the top surface 6, is larger in cross-sectional area than other portions of the tube, and preferably is elliptical in cross-section. As best seen in FIG. 2, the inlet openings 40 are in fluid communication with the reservoir 10 defined beneath the top surface 6.

Figure 4:
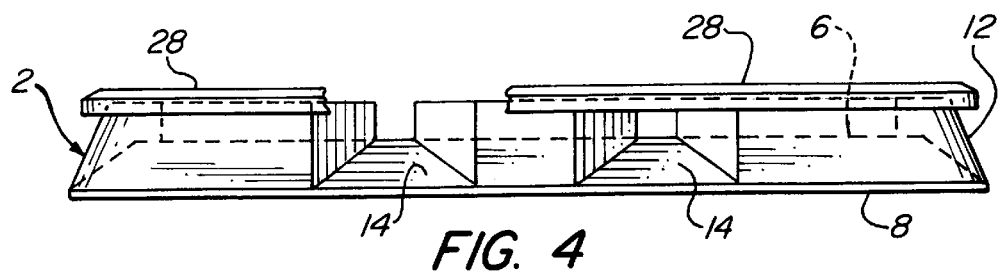
FIG. 4 illustrates a partial side elevational view of the device illustrated by FIG. 1 with the cover mounted thereon.

FIG. 4 illustrates a front elevational view of the device shown in FIG. 1 with the cover mounted to the top of the base. The same reference numerals have been used in FIG. 4 to designate corresponding elements shown in FIGS. 1–3. The ramp shaped cutout sections 14 are defined between the cover 28 and the base 2 when the cover is mounted atop the base. The cutout portions 14 provide access for insects and other animals attracted to the feeding stations 16 on the top surface 6 of the base.

In accordance with the device disclosed by FIGS. 1–4, fluid material, such as a liquid or semi-liquid insecticide, is supplied to the reservoir 10. This is accomplished by removing the cover 28 from the base to expose the tops of the channels 22 defined in the posts 20. Material is injected into the inlet ends of these channels and discharged into the reservoir through the opposed outlet ends 24 of the channels which define discharge openings in fluid communication with the reservoir 10. The cover is then placed atop the base so that the plug elements 32 extending from the bottom surface of the cover are received in the top inlet openings of the channels 22 to seal the channels and prevent discharge of material from the reservoir through the channels 22. With the channels 22 plugged, material in the reservoir 10 can be discharged therefrom only through the capillary tubes 38, each of which has an inlet opening 40 in fluid communication with the reservoir 10. The discharge end defining outlet opening 18 of each tube 38 terminates in a feed station 16, as illustrated in FIG. 1. Accordingly, the tubes 38 provide means for transporting material from the reservoir 10 to the feed stations 16 on the top surface 6 of the base.

The transport of fluid from the reservoir to the feed stations occurs as a result of capillary action resulting from or aided by the withdrawal of material from the tubes 38 by insects feeding from the outlet openings 18 in the feed stations 16. The effect of the capillary action is enhanced as a result of the angular orientation and the elliptical cross-section of the inlet opening 40 of each of the tubes 38. This enhancement occurs as a result of the wider cross-sectional area of the discharge opening as compared to the narrower cross-sectional area of the remaining portions of each tube. The angular orientation of the inlet openings 40 of each tube relative to the longitudinal plane of the top surface 6 of the base also enhances the effect of capillary action by drawing material from the reservoir 10 at an angle which is other than peripendicular to the upper surface 6 of the base, thereby permitting substantially all of the material in the reservoir to be drawn into the tube and leaving only a relatively small quantity of residual material in the reservoir.

As most clearly illustrated by FIG. 1, each of the plurality of feed stations 16 includes a plurality of capillary tubes 38 received therein for supplying fluid from the reservoir through the outlet openings 18 of each tube 38 received in each feed station 16. By providing a plurality of capillary tubes in fluid communication with each feed station, the diameters of the discharge outlets 18 of the tubes 38 can be relatively small in dimension. In this manner, the surface area of each opening 18 exposed to the atmosphere is relatively small, thereby minimizing evaporation of material in the reservoir and reducing solidification of material in the tubes 38 proximate to the outlet openings 18. Additionally, the relatively small diameters of the outlet openings 18 of each of the plurality of capillary tubes communicating with each feed station reduces the quantity of material that might be discharged from the tubes in the event that the device is inadvertently tilted or inverted by the user.

The ring shaped open well sponge 23 mounted around each post 20 contains water. Each sponge is supported by the upper surface 6 of the base, and therefore is oriented in a plane substantially common to that of the plurality of feed stations 16. Evaporation of water contained in the sponges 23 therefore provides a source of water vapor proximate to the outlet openings 18 of the feed stations. By maintaining the humidity of the ambient air near the outlet openings at a relatively high level, fluid material, and particularly the fluid material in the capillary tubes 38 proximate to the outlet openings 18, is maintained at relatively low viscosity, thereby tending to prevent solidification of the material near the outlet openings 18. This results in freely flowable material as insects feed at the feeding stations, encouraging insect feeding.

The embodiment of the invention illustrated by FIGS. 1–4 of the drawing discloses a single common reservoir 10 in fluid communication with each of the plurality of feed stations 16. In the alternative, the reservoir 10 can be partitioned into separate reservoir sections, each of which are in fluid communication with only a single predesignated feed station, or a plurality of different individual feed stations less than the total number of feed stations provided on the top surface of the base. In this manner, different partitioned sections of the reservoir can be provided for delivery of different fluids to one or more separate, selected feed stations 16. Separate posts 20 are provided so that separate channels 22 are in fluid communication with one or more of the different partitioned reservoir sections to provide separate means for supplying and refilling the different reservoir sections with different fluid material, if desired.

Figure 5:
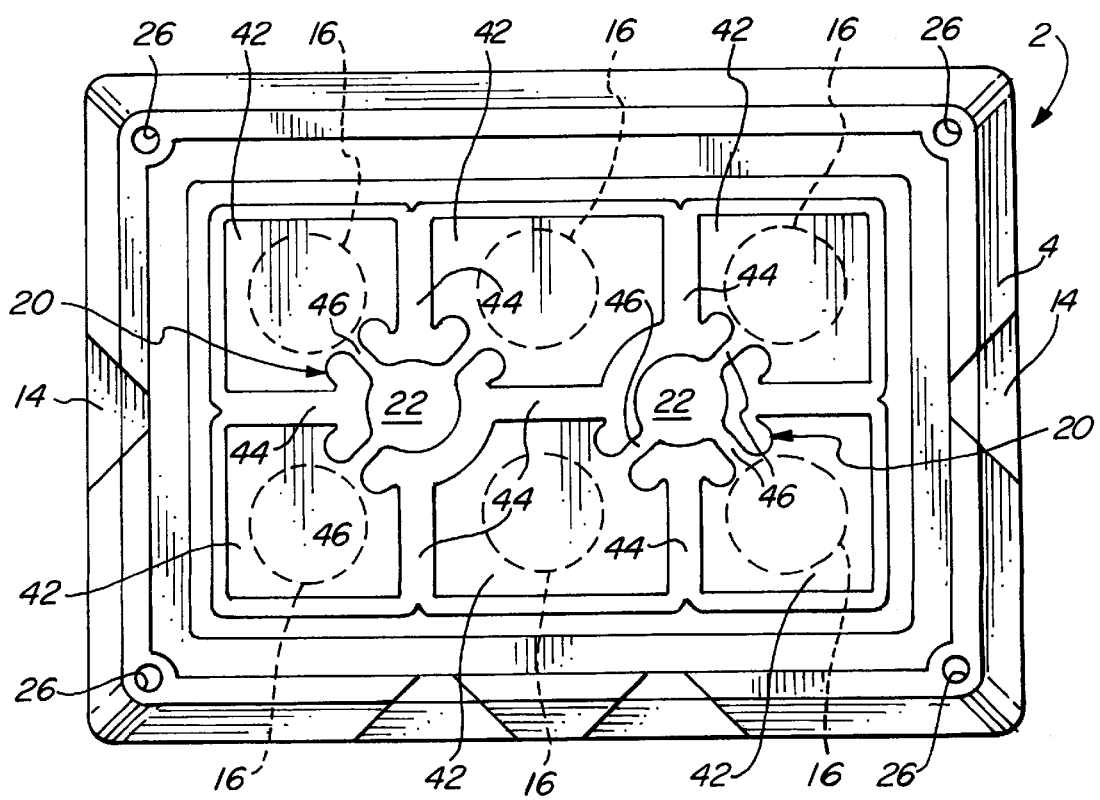
FIG. 5 is a top plan view, in section, of a modification to the device illustrated by FIGS. 1–4 in accordance with the present invention.

FIG. 5 of the drawings illustrates one embodiment of a fluid delivery device in accordance with the present invention in which the common reservoir of the device illustrated by FIGS. 1–4 has been modified to define a plurality of separate partitioned reservoir sections. The same reference numerals have been used in FIG. 5 to designate corresponding elements in FIGS. 1–4.

FIG. 5 is a top plan view, in section, as seen beneath the base 4 of the housing 2. Similar to the previously discussed embodiments of the invention, the top surface of the base 4 is illustrated as carrying six feeding stations 16. In the embodiments illustrated by FIGS. 1–4, the common reservoir 10 is defined beneath the base 4, and fluid from the reservoir is delivered to each of the feeding stations 16 through tubes 38 by capillary action. In the modification illustrated by FIG. 5, the common reservoir 10 has been replaced by six separate reservoir sections each designated by reference numeral 42. Each separate reservoir section is in fluid communication with a separate feeding station 16 by one or more connecting tubes. The plurality of reservoir sections 42 are defined by partitions generally designated by reference numerals 44. Two posts 20, each defining channels 22 therein, are in fluid communication with the reservoir sections 42. More specifically, the bottom section of each post 20 defines three slots or grooves 46, each of which is in fluid communication with a different reservoir section 42. Accordingly, channel 22 defined in one post 20 is in separate fluid communication with three of the reservoir sections 42, while channel 22 defined in the second post 20 is in separate fluid communication with three different reservoir sections 42.

In a manner similar to that discussed with respect to the embodiments of the invention illustrated by FIGS. 1–4, the channels 22 in each of the posts 20 provide means for supplying fluid to the different groups of reservoir sections 42. As also discussed with respect to the FIGS. 1–4 embodiments, the top ends of the channels 22 are adapted to receive corresponding elements extending from the bottom surface of a removable cover for both supporting the cover over the base and for sealing the top ends of the channels 22 to prevent inadvertant discharge of material from the reservoir sections 42 through the top ends of the channels 22.

By dividing the reservoir into separate reservoir sections, the fluid in the reservoir is maintained more uniformly distributed throughout the bottom of the device. Accordingly, if the device is inadvertently tilted, the partitions 44 inhibit substantial displacement or flow of fluid from one section into another section, thereby avoiding the generation of excessive fluid pressure at any single location within the device. Moreover, by providing different supply channels 22 in fluid communication with different reservoir sections, different materials can be held in the reservoir and delivered to the different feeding stations in fluid communication with the separate reservoir sections. Although the embodiment illustrated by FIG. 5 shows two supply channels 22 each in fluid communication with three separate reservoir sections, modifications to this arrangement are apparent. For example, it is within the scope of the invention to provide a separate supply channel 22 in fluid communication with each separate reservoir section 42 so that each separate feed station is in fluid communication with a separate corresponding reservoir section and is supplied with a different material from its corresponding reservoir section. Accordingly, both the number of reservoir sections and the number of supply channels can be varied from that illustrated by FIG. 5. Except for the separate partitioned reservoir sections 42 and the associated supply channels 22 discussed above, the embodiment of the invention illustrated by FIG. 5 operates in the same manner as the embodiments of the invention illustrated by FIGS. 1–4.

In operation of the devices of FIGS. 1–5 when used as insect bait stations, the reservoir is filled with a suitable attractant/insecticide. Insects are attracted to the device, and enter it through the cutout sections 14 defined between the cover of the upper surface of the base. The insects feed on insecticide from the reservoir which is delivered to the feeding stations 16 through the outlet openings 18 of the capillary tubes in fluid communication with the reservoir. As the insects draw fluid from the outlet openings 18, fluid continues to flow from the reservoir as a result of capillary action which is enhanced by the suction generated by the withdrawal of material by the feeding insects. If the insecticide delivered to the feeding stations is fast acting, the cover can be periodically removed from the base to dispose of dead insects within the device. If the insecticide used is of the delayed acting type, insects will exit the device through the openings 14 after they have fed, and feed other insects which have not entered the bait station. The reservoir is refilled with insecticide through the channels in the supporting posts, and the top ends of the posts are sealed when the cover is mounted over the base. The specific operating parameters of the device, such as the diameter of the capillary tubes, the area of the widened inlet opening of the capillary tubes, and the angle of the inlet portions of the capillary tubes relative to the longitudinal plane of the base, are variable and depend upon the specific material and the viscosity of the material being delivered from the reservoir.

Other modifications and variations of the embodiments discussed herein within the scope of the invention will be apparent to those skilled in the art. For example, the shape of the base, the number of feeding stations, the number of outlet openings in each feeding station, the number of supporting posts and supply channels, and the number of partitioned reservoir sections can vary from that disclosed herein. Accordingly, the discussion of the preferred embodiments of the invention are intended to be illustrative only, and not restrictive of the scope of the invention, that scope defined by the following claims and all equivalents.

What is claimed is:

1. A bait station comprising:
   a base having at least one feeding station, said base comprising a bottom surface and a top surface, said feeding station defined on said top surface of said base,
   a reservoir defined between said top surface and said bottom surface of said base, and
   means for providing fluid communication between said reservoir and said at least one feeding station on said top surface of said base, said means for providing fluid communication comprising at least one tube for transporting fluid in said reservoir to said at least one feeding station on said base; said at least one tube having a first end in fluid communication with said at least one feeding station on said base, and a second end in fluid communication with said reservoir, said second end oriented at an angle other than perpendicular relative to a longitudinal plane of said base;
   said second end of said at least one tube defining an inlet opening being greater in cross-sectional area than other portions of said tube.

2. The bait station as claimed in claim 1 wherein said at least one tube is adapted to transfer said fluid from said reservoir to said at least one feeding station by capillary action.

3. The bait station as claimed in claim 1 wherein said inlet opening of said at least one tube is substantially elliptical in cross-sectional shape.

4. The bait station as claimed in claim 1 wherein a plurality of said tubes are in fluid communication with said at least one feeding station for transporting fluid from said reservoir to said at least one feeding station.

5. The bait station as claimed in claim 1 wherein a plurality of feeding stations are provided on said top surface of said base.

6. The bait station as claimed in claim 5 wherein said means for providing fluid communication comprises a plurality of tubes in fluid communication between said reservoir and each of said plurality of feeding stations for transporting fluid in said reservoir to said plurality of feeding stations.

7. The bait station as claimed in claim 1 further including at least one member extending from said top surface of said base, said member defining a channel therein having a first end in fluid communication with said reservoir and a second end located above said base such that fluid can be transported into said reservoir through said channel in said member.

8. The bait station as claimed in claim 7 wherein said at least one member provides means for supporting a cover above said base.

9. The bait station as claimed in claim 8 further including a removable cover having an element thereon which is oriented relative to said cover to be received in said second opening in said at least one member for sealing said second opening in said at least one member when said cover is mounted to said base.

10. The bait station as claimed in claim 1 wherein said reservoir defines at least two separate reservoir sections; wherein said at least one feeding station comprises a plurality of separate feeding stations on said top surface of said base; and said means for providing fluid communication provides fluid communication between at least one of said two separate sections of said reservoir and a separate one of said plurality of feeding stations provided on said top surface of said base.

11. The bait station as claimed in claim 10 wherein the number of said separate reservoir sections corresponds to the number of said plurality of feeding stations, and said means for providing fluid communication provides fluid communication between each of said separate reservoir sections and a different one of said plurality of feeding stations.

12. The bait station as claimed in claim 10 further including separate means in fluid communication with each of said at least two separate reservoir sections for supplying fluid to one of said separate reservoir sections independent of the other of said separate reservoir sections.

13. The bait station as claimed in claim 1 further including means for controlling the humidity of ambient air proximate to said at least one feeding station for preventing solidification of material in said at least one feeding station.

14. A fluid delivery device comprising:
   a base having at least one predetermined opening, said base comprising a bottom surface and a top surface, said at least one predetermined opening defined on said top surface,
   a reservoir defined between said top surface and said bottom surface of said base, and
   means for providing fluid communication from said reservoir to said at least one predetermined opening on said top surface of said base, said means for providing fluid communication comprising at least one tube for transporting fluid from said reservoir to said at least one predetermined opening on said base; said at least one tube having a first end in fluid communication with said at least one predetermined opening on said base, and a second end in fluid communication with said reservoir, said second end oriented at an angle other than perpendicular relative to a longitudinal plane of said base;
   said second end of said at least one tube defining an inlet opening, said inlet opening being greater in cross-sectional area than other portions of said tube.

15. The device as claimed in claim 14 wherein said at least one tube is adapted to transport said fluid by capillary action.

16. The device as claimed in claim 14 wherein said inlet opening is substantially elliptical in cross-sectional configuration.

17. The device as claimed in claim 14 further including at least one member extending from said top surface of said base, said member defining a channel therein, said channel having a first end thereof defining a first opening in fluid communication with said reservoir and a second end thereof defining a second opening located above said base, wherein material can be transported into said reservoir through said channel in said member.

18. The device as claimed in claim 17 wherein said at least one member provides means for supporting a cover above said base.

19. The device as claimed in claim 17 further including a cover removably mountable over said base, said at least one member providing means for supporting said cover over said base.

20. The device as claimed in claim 19 wherein said cover includes at least one element thereon, said element being oriented relative to said cover to be received in said second opening in said at least one member for sealing said second opening when said cover is mounted over said base.

21. The device as claimed in claim 14 wherein said reservoir defines at least two separate sections and said at least one predetermined opening on said base comprises a plurality of predetermined openings on said base, and said means for providing fluid communication provides fluid communication between each of said separate sections of said reservoir and a different one of said plurality of predetermined openings on said base.

22. The device as claimed in claim 21 further including separate means in fluid communication with said at least two said separate reservoir sections for supplying fluid to one of said separate reservoir sections independent of the other of said separate reservoir sections.

23. The device as claimed in claim 14 further including means for controlling the humidity of ambient air proximate to said at least one predetermined opening on said base for preventing solidification of material in said at least one predetermined opening.

24. A method of delivering insecticide to a predetermined insect feeding station, the steps of said method comprising:

defining at least one insect feeding station at a predetermined location on a top surface of a unitary bait station comprising said top surface and a bottom surface, providing a reservoir for fluid insecticide positioned below said feeding station;

providing means for coupling said reservoir in fluid communication with said insect feeding station;

transporting said fluid insecticide from said reservoir to said insect feeding station by capillary action; and controlling the humidity of air proximate to said at least one feeding station for preventing solidification of material in said at least one feeding station.

25. The method as claimed in claim 24 further including the step of providing a plurality of said insect feeding stations, and transporting said fluid insecticide from said reservoir to each of said plurality of insect feeding stations by capillary action.

26. The method as claimed in claim 25 further including the steps of partitioning said reservoir into at least two separate reservoir sections, and transporting said fluid insecticide from each of said separate reservoir sections to a different one of said plurality of insect feeding stations.

27. The method as claimed in claim 26 further including the step of separately supplying fluid to each of said at least two separate reservoir sections independent of each other.

28. The method as claimed in claim 24 further including the step of supplying fluid to said reservoir through conduit means extending through said base.

* * * * *